(12) United States Patent
Fridley

(10) Patent No.: US 6,793,473 B1
(45) Date of Patent: Sep. 21, 2004

(54) SELF-ALIGNING CUTTER HUB ASSEMBLY

(75) Inventor: Michael A. Fridley, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 10/609,131

(22) Filed: Jun. 30, 2003

Related U.S. Application Data

(63) Continuation of application No. 09/813,915, filed on Mar. 22, 2001, now abandoned.

(51) Int. Cl.[7] .................................................. B29B 9/06
(52) U.S. Cl. ........................ 425/67; 425/196; 425/313; 464/145
(58) Field of Search ................................ 425/311, 313, 425/196, 67; 464/144, 145, 906; 264/142

(56) References Cited

U.S. PATENT DOCUMENTS

| | | | | |
|---|---|---|---|---|
| 1,916,442 A | * | 7/1933 | Rzeppa | 464/145 |
| 2,047,660 A | * | 7/1936 | Anderson | 464/144 |
| 2,150,952 A | * | 3/1939 | Ward | 464/146 |
| 2,182,455 A | * | 12/1939 | Smith | 464/145 |
| 2,381,096 A | * | 8/1945 | Abbott | 464/145 |
| 2,615,317 A | * | 10/1952 | Rzeppa | 464/141 |
| 2,653,456 A | * | 9/1953 | Heym | 464/141 |
| 3,176,477 A | * | 4/1965 | Mazziotti | 464/144 |
| 3,196,487 A | | 7/1965 | Snelling | 18/12 |
| 3,982,840 A | * | 9/1976 | Grosseau | 403/14 |
| 4,123,207 A | | 10/1978 | Dudley | 425/67 |
| 4,251,198 A | | 2/1981 | Altenburg | 425/67 |
| 4,358,283 A | * | 11/1982 | Kumpar | 464/143 |
| 4,500,271 A | | 2/1985 | Smith | 425/67 |
| 4,621,996 A | | 11/1986 | Hundley, III | 425/190 |
| 4,728,276 A | | 3/1988 | Pauley et al. | 425/67 |
| 5,059,103 A | | 10/1991 | Bruckmann et al. | 425/67 |
| 5,230,659 A | * | 7/1993 | Bird et al. | 464/143 |
| 5,403,176 A | | 4/1995 | Bruckmann et al. | 425/464 |
| 5,599,234 A | * | 2/1997 | Harz et al. | 464/145 |
| 5,624,688 A | * | 4/1997 | Adams et al. | 425/67 |
| 5,632,683 A | * | 5/1997 | Fukumura et al. | 464/144 |
| 5,823,883 A | * | 10/1998 | Hopson | 464/145 |

FOREIGN PATENT DOCUMENTS

DE  26 38 126  3/1978

* cited by examiner

Primary Examiner—Robert Davis
Assistant Examiner—Joseph S Del Sole
(74) Attorney, Agent, or Firm—Jacobson Holman PLLC

(57) ABSTRACT

An assembly retainer for a self-aligning pelletizer cutter hub having a self-aligning driving connection between a cutter hub and a drive shaft for the hub in which the cutter hub is capable of universal pivotal movement as well as a driving connection through diametrically located recesses and spherical balls. The retainer is supported on the hub to retain the torque transmitting balls in the recesses. In one embodiment, the balls are retained by circular plates attached to the hub in position to form a closure for an open end of each recess. In another embodiment, spring pins are inserted in passageways in the hub with one end extending into an open end of said recesses to form an obstruction in each recess.

18 Claims, 3 Drawing Sheets

PRIOR ART

SELF-ALIGNING CUTTER HUB ASSEMBLY

This application is a continuation of Ser. No. 09/813,915, filed Mar. 22, 2001, now abandoned.

BACKGROUND OF THE INVENTION

1. Field of the Invention

The present invention generally relates to a self-aligning cutter hub assembly mounted on the end of the drive shaft of an underwater pelletizer which orients the cutter hub and blades mounted thereon in optimum aligned relation to the die face of the extrusion die plate of the underwater pelletizer. More specifically, the present invention represents an improvement on the self-aligning cutter hub structure disclosed in U.S. Pat. No. 5,624,688 (owned by the Assignee of the present application) and includes an assembly retainer in the form of spring pins or attachments to retain the self-aligning cutter hub elements within the bore of the cutter hub when the underwater pelletizer is disassembled.

2. Description of the Prior Art

Underwater pelletizers for forming plastic pellets by the use of an extrusion die having orifices through which molten polymer is extruded out from a die face for engagement by cutter blades mounted on a rotatable cutter hub and driven by a drive shaft are well known. One of the characteristics of underwater pelletizers is the desirability of maintaining the cutter blades and die face in properly aligned relation in order that the cutting edge of the blades on the rotating cutter hub move in very close parallel relation to the die face. This close parallel relationship allows the blades to efficiently cut the extruded plastic into pellets as the plastic strings are discharged from the orifices in the extrusion die plate and prevents unnecessary wear of the cutter blade and/or die plate face. The following additional U.S. patents, also owned by the Assignee of this application, relate to underwater pelletizers, cutter hub assemblies and structures for positioning the cutters and cutter hub in desired relation to the die face of the die plate:

| | | |
|---|---|---|
| 4,123,207 | 4,621,996 | 5,403,176 |
| 4,251,198 | 4,728,276 | |
| 4,500,271 | 5,059,103 | |

The above referenced patents, and the references cited in those patents, which are incorporated herein as if fully identified, disclose various underwater pelletizer structures and components thereof.

With respect to U.S. Pat. No. 5,624,688 this patent discloses a self-aligning cutter hub assembly which connects the cutter hub to the pelletizer drive shaft. The assembly transmits torque from the drove shaft to the cutter hub while at the same time allowing limited universal movement of the cutter hub in relation to the rotational axis of the drive shaft. This universal movement enables the cutter blades on the cutter hub to maintain optimum parallel relation to the die face of the extrusion die plate to efficiently cut the extruded plastic material into pellets. The structure connecting the cutter hub to the drive shaft also enables effective assembly and disassembly of the components of the cutter hub onto and off of the end of the drive shaft.

More specifically, the cutter hub of the '688 patent includes a central bore defining an inner surface and an adapter received in the bore and fixedly attached to the end of the drive shaft. The inner surface of the hub bore and the outer surface of the drive shaft adapter are provided with corresponding partial spherical surfaces which coact to enable the requisite universal movement of the cutter hub in relation to the drive shaft. The drive shaft adapter is mounted on the end of the drive shaft, as by screw threads or the like, and the adapter and hub bore each include diametrically arranged recesses for partially receiving spherical balls which transmit the driving torque from the drive shaft to the cutter hub.

The recesses on the inner surface of the cutter hub bore are preferably diametrically opposed axial recesses or grooves which extend inwardly from one end surface of the cutter hub but do not extend completely to the other end surface of the cutter hub. The inner surface of the cutter hub bore also includes a short circumferential recess extending from each edge of the axial recess or groove and opening to the end surface of the cutter hub open to the axial recess. The recesses enable the adapter and torque transmitting balls to be assembled into the bore of the cutter hub when the adapter is oriented in perpendicular relation to the surface of the cutter hub. The drive shaft adapter can then be rotated 90° to register the partially spherical inner surface in the bore of the cutter hub with the partial spherical outer surface of the adapter.

The recesses or grooves in the inner surface of the cutter hub bore receive the torque transmitting balls during assembly of the drive shaft adapter with pivoting of the adapter into final position locking the torque transmitting balls in position. The adapter can then be assembled onto the drive shaft, such as by a screw threaded engagement between the drive shaft and adapter or other engagement assembly.

SUMMARY OF THE INVENTION

When handling the self-aligning cutter hub assembly as disclosed in the '688 patent, either when assembling for installation in the pelletizer or when disassembling to change or adjust components of the pelletizer, in some instances, the drive shaft adapter can pivot to a position perpendicular to the cutter hub. In this position, the adapter can fall out of or disassemble from the hub by gravity if the hub is supported with the open ends of the axial recesses facing downwardly or when a force is applied to the adapter that would move the balls out of the axial recesses or grooves in the hub. When this occurs, the torque transmitting balls may fall out of the recesses in the adapter and become lost or require considerable time and effort to locate. Then additional time is required to reassemble the balls, adapter and cutter hub.

In order to overcome the foregoing difficulty, the present invention provides an assembly retainer for the cutter hub which includes a structure that places an obstruction in the open end area of the axial recesses. This obstruction then prevents the torque transmitting balls from moving out of the axial recesses thereby maintaining the hub, drive shaft adapter and balls in assembled relation when the self-aligning cutter hub is not assembled on the drive shaft such as when components of the cutter hub are being replaced, adjusted and the like.

In one embodiment, the assembly retainer for the self-aligning cutter hub includes a circular plate or washer associated with the open end of each axial recess in which a torque transmitting ball is positioned to prevent the ball from exiting the open end of the axial recess. The ball retaining plates or washers are secured to the cutter hub by the use of a screw threaded fastener or the like extending into the end surface of the cutter hub to which the axial recess opens, thereby retaining the adapter, balls and cutter hub in assembled relation and preventing accidental disassembly when the cutter hub is being handled, attached to the drive shaft, detached therefrom or otherwise not associated with a die plate or drive shaft.

In a second embodiment, the assembly retainer for the self-aligning cutter hub includes spring pins inserted in angular passageways in the cutter hub which communicate with the open end of the axial recesses in the bore of the cutter hub. A spring pin is inserted in each of the angular passageways with one end of each spring pin terminating in the end of the axial recess and forming an obstruction to prevent the torque transmitting balls from exiting the axial recesses in the cutter hub and limiting the pivotal movement of the cutter hub in relation to the adapter during assembly, disassembly and adjustment of the cutter hub.

Preferably, the cutter hub and drive shaft adapter are each provided with four recess arrangements oriented at 90° positions around their circumference. Having four recess arrangements facilitates maintenance and enhances the life of the self-aligning cutter hub by enabling an operator of the pelletizer to initially use one set of the diametrically opposed recesses in the outer surface of the adapter, one pair of balls and one set of recesses in the inner surface of the bore together with appropriate retainers. Then, after requisite use and wear, the pelletizer operator may remove the assembly retainer, disassemble the adapter and balls from the hub and then reassemble the adapter, balls and hub utilizing the previously unused set of diametrically opposed recesses in the adapter and hub and inserting the retainers in the same manner as when oriented in relation to the originally used recesses. Optionally, a new set of balls may also be used if the original balls show any evidence of wear. As such, the present invention enables a prolonged useful life of the self-aligned cutter hub which will be retained in assembled relation by the assembly retainers during handling, assembly, disassembly and adjustment of the cutter hub assembly.

Accordingly, it is an object of the present invention to provide a self-aligning cutter hub assembly which includes an assembly retainer to keep the torque transmitting balls from coming out of the cutter hub axial recesses when the components of the cutter hub are being replaced, adjusted and the like.

Another object of the present invention is to provide a self-aligning cutter hub with an assembly retainer which keeps the drive shaft adapter from inadvertently disassembling from out of the cutter hub bore during handling, assembly, disassembly and adjustment of the cutter hub assembly.

A further object of the present invention is to provide a self-aligning cutter hub assembly with an assembly retainer which keeps the cutter hub from coming apart when the hub is handled improperly during replacement, adjustment, etc. of the pelletizer components.

Still another object of the present invention is to provide a self-aligning cutter hub assembly which has a prolonged useful life by reason of a duplicate pair of diametrically opposed recesses in the cutter hub and drive shaft adapter, thus providing duplicate assembly arrangements.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
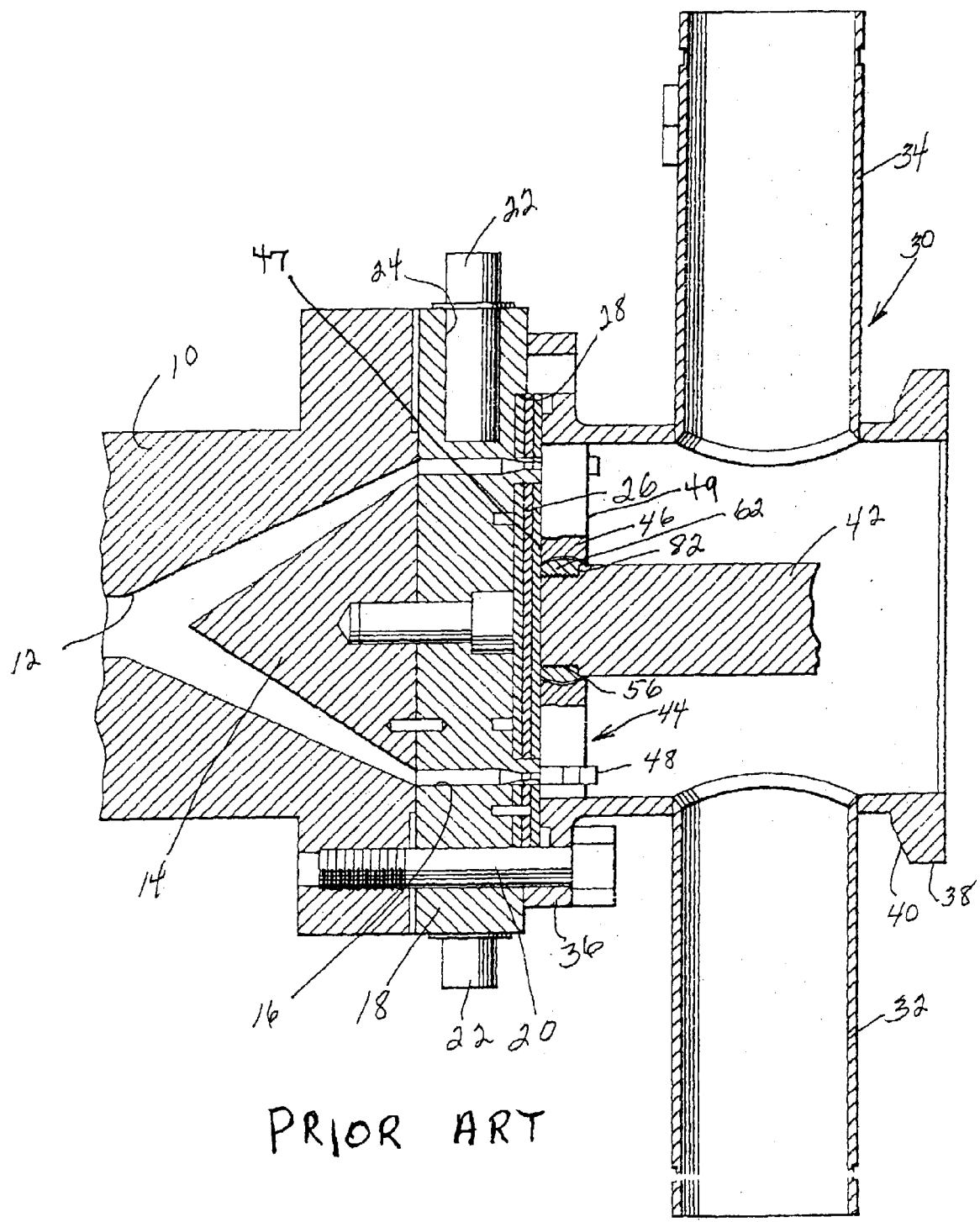
FIG. 1 is a sectional view of a conventional pelletizer illustrating a self-aligning cutter hub associated with other components of a pelletizer.

Although only two preferred embodiments of the invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Referring now to FIG. 1 of the drawings, this drawing illustrates an underwater pelletizer structure with a self-aligning hub incorporated therein as shown in the '688 patent. The pelletizer includes an inlet housing 10 having an inlet passageway 12 for receiving molten polymer from upstream equipment. The molten polymer is diverted outwardly by a nose cone 14 and enters into a plurality of extrusion orifices 16 in a die plate 18. The die plate 18 is secured to the inlet housing by fastening bolts or the like 20 and typically is provided with heating elements 22 located in cavities 24 in the die plate. The die plate includes a die face 26 of wear resistant material which is mounted on the die plate along with heat transfer plates 28.

Attached to the housing 10 and die plate 18 is a cutter chamber generally designated by reference numeral 30 which includes a circulating water inlet passageway 32 and a discharge passageway 34 for the water and entrained pellets. The cutting chamber includes a flange 36 attached to the die plate and housing and a flange 38 at the opposite end thereof having an inclined surface 40 for association with a similar flange on an adapter connected to a drive unit. A drive shaft 42 extends through the cutter chamber 30 and supports and drives a cutter assembly generally designated by reference numeral 44. The cutter assembly 44 includes a cutter hub 46 and a plurality of cutter knives 48 having their cutting edge associated with the die face 26 and the discharge point of the orifices 16. The cutter hub includes two end surfaces, one end surface 47 faces the die plate 18 and the other end surface 49 faces away from the die plate toward the drive motor (not shown). All of the above mentioned structure is known. The present invention relates specifically to the cutter hub 46 and the manner in which the components thereof are retained in assembled relation.

Figure 2:
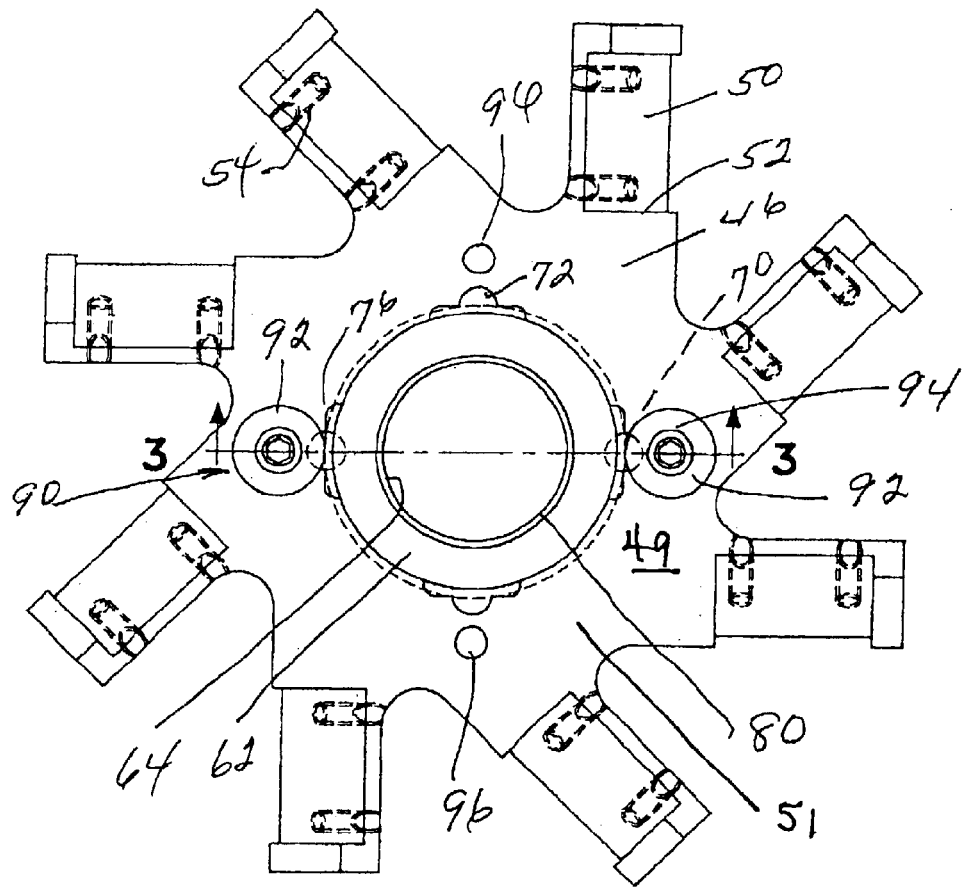
FIG. 2 is an end elevational view of the cutter hub assembly of the present invention without the cutter knives and illustrating the orientation of the components of the hub in a first embodiment of the assembly retainer.
Figure 3:
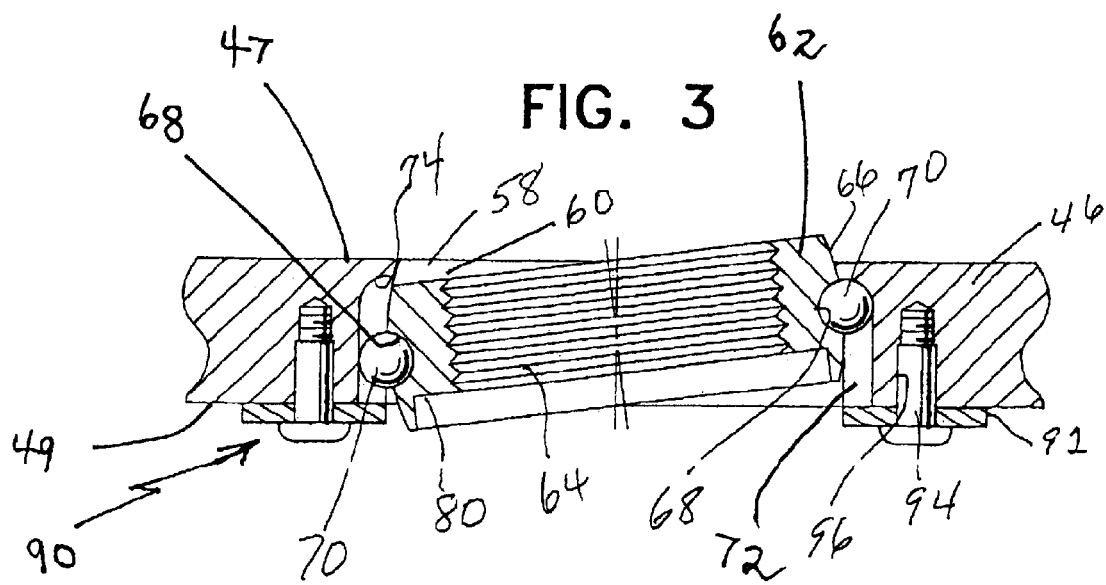
FIG. 3 is a sectional view, on an enlarged scale, taken along section line 3—3 on FIG. 2, illustrating the matching relationship between the exterior of the adapter, the interior of the bore in the cutter hub, the torque transmitting balls and the assembly retainer in the form of circular plates retaining the balls in the axial recesses in the hub bore.

As illustrated in FIG. 2, the cutter hub 46 includes a plurality of arms 50, each having notches 52 which receive the cutter blades that are secured by the use of conventional fasteners threaded into threaded bores 54 as is well known in the art. The arms 50 are integral with the central portion 51 of hub 46. The hub 46 is provided with an axial bore 58 which extends therethrough and which has an inner face that is partially spherical as indicated by reference numeral 60 in FIG. 3. Positioned in the bore 58 is a drive shaft adapter 62 having an internally threaded bore 64 extending therethrough. The threaded bore 64 allows the adapter 62 to be screw threadedly connected onto a reduced externally threaded end portion 56 of the drive shaft 42 to form a rigid unit. The exterior surface of the adapter 62 is also partially spherical as indicated by reference numeral 66 in FIG. 3. The curvature of the partially spherical surfaces 60 and 66 are matching or corresponding and closely associated as illustrated in FIG. 3. As such, the diameter of the partially spherical surfaces at the end edges thereof are less than the diameter at the central portions.

The partially spherical exterior surface 66 of the adapter 62 is provided with a pair of diametrically opposed generally semispherical recesses 68 oriented equally distant from the end edges of the partially spherical surface 66 as illustrated in FIG. 3. Received in each of the semispherical recesses 68 is a spherical ball 70.

The hub bore 58 includes a pair of diametrically opposed axial, semicylindrical recesses 72 which extend inwardly from end surface 49 of the hub bore. The recesses 72 terminate at their inner ends in a partially spherical inner end 74 which is adjacent but spaced from the opposite end surface 47 of the bore 58. The recesses 72 receive the balls 70 which provide the torque transfer from the shaft 42 and adapter 62 to the hub 46.

In order to assemble the adapter 62 and balls 70 with respect to the bore 58, the bore 58 includes an axial recess 76 in end surface 49 which extends circumferentially a short distance from the edges of the recess 72 and terminates with an inner end spaced from the spherical portion 74 of the recess 72. The recesses 76 are provided to enable the partially spherical surface 66 of the adapter 62 to be inserted into the bore 58 when the adapter 62 is oriented in substantially perpendicular relation to the bore. The balls 70 are placed and retained in the cavities 68 in a suitable manner, such as by the application of grease or the like. With the adapter 62 in substantially perpendicular relation to the hub 46, the balls 70 can be received in the recesses 72 when the assembled adapter 62 is moved into the bore 58. The bore 58 does not block the larger diameter central portion of the surface 66 of the adapter .62 because of recesses 76 in end surface 49. When the balls 70 reach a central point between the two ends of the bore 58, the adapter 62 can be rotated 90° into the bore 58 with the partially spherical surfaces 60 and 66 being in close registry as illustrated in FIG. 3. The curvature of the surfaces 60 and 66 then serves to retain the adapter 62 within the bore 58 and retain the balls 70 in the recesses 68 and 72.

The balls 70 transmit driving torque and the surfaces 60 and 66 enable the hub 46 to pivot universally in relation to the drive shaft. This universal movement enables the cutter hub 46 and cutter knives 48 to remain oriented in parallel closely spaced relation to the die face 26 for efficiently cutting the extruded plastic into pellets regardless of angular variation in the drive shaft 42.

After the adapter 62 has been assembled into the cutter hub 46 to the position illustrated in FIG. 3, the cutter hub and adapter are mounted on the drive shaft 42 by engaging the internal threads 64 of the adapter 62 with the external threads 56 of the drive shaft 42 until the axial recess 80 formed in one end of the adapter 62 receives the shoulder 82 on the end of the shaft. As assembled, the outer spherical surface 66 of the adapter, and the matching inner spherical surface 60 of the hub bore 58, are oriented slightly outwardly of the periphery of the drive shaft in view of the distance between the periphery of the internal recess 80 and the periphery of the surfaces 66 and 60 radially outwardly thereof. This assembly enables the cutter hub to pivot universally on the end of the drive shaft 42 as defined by the adapter 62 which is rigidly secured thereon. While the self-aligning hub has been disclosed in association with a cutter assembly for underwater pelletizers, it can be adapted for other uses in which a rotating component is attached to a shaft to enable the rotating component to align with an associated structure.

The previously disclosed structure and operational procedure of the self-aligning cutter hub correspond with that disclosed in the '688 patent. In order to prevent unwanted and accidental disassembly of the adapter 62 from the cutter hub 46 which could occur when the adapter 62 and the hub 46 assume a substantially perpendicular relation, such as when the cutter hub assembly is separated from the drive shaft, the present invention includes an assembly retainer generally designated by reference numeral 90 in FIGS. 2 and 3. The assembly retainer 90 includes a circular flat plate or washer 92 associated with each of the axial recesses 72 in the cutter hub 46 that is occupied by a ball 70. The periphery of the plate or washer 92 forms a closure for the end of the recess 72 thus providing an obstruction to prevent exit of the balls 70 from the open end of the recess 72 when the adapter 62 and hub 46 are oriented in a generally perpendicular relation, which occurs by pivoting the adapter 62 about an axis passing through the opposed balls 70. In this position, without the plates or washers 92 being installed, the adapter 62 and the balls 70 can disassemble from the hub 46 as the balls 70 move out of the outer ends of the axial recesses 72 in a manner reverse to the manner of assembling the balls 70 and adapter 62 into the cutter hub 46. The structure of the assembly retainer 90 retains the balls 70 in the axial recesses 72 and prevents unwanted disassembly of the balls and adapter from the cutter hub.

Each of the retainer plates or washers 92 is secured in place preferably by a screw threaded member 94 extending into and in screw threaded engagement with a blind bore 96. The bore 96 extends inwardly into the cutter hub 46 from end surface 49. The fasteners 94 may be provided with a screw driver blade receiving kerf or can be provided with a polygonal periphery for engagement by a wrench or other suitable tool. The retaining plates or washers 92 effectively retain the balls 70 in the recesses 72.

Figure 4:
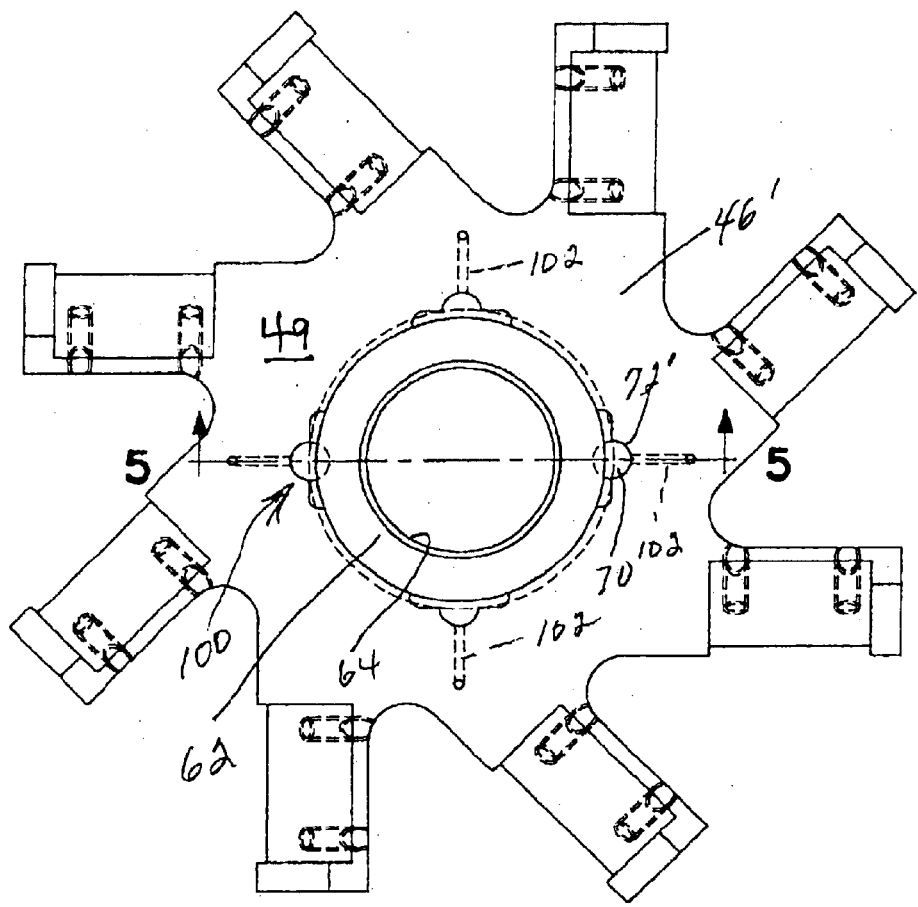
FIG. 4 is an end elevational view of the cutter hub assembly of the present invention without the cutter knives and illustrating the orientation of the components of the hub in a second embodiment of the assembly retainer.
Figure 5:
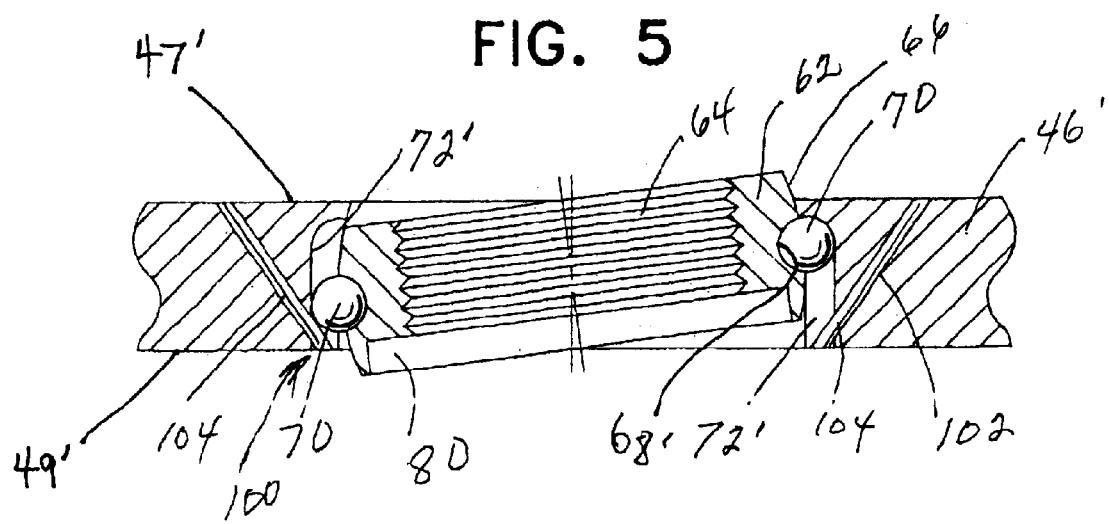
FIG. 5 is a sectional view, on an enlarged scale, taken along section line 5—5 on FIG. 4, illustrating the matching relationship between the exterior of the adapter, the interior of the bore in the cutter hub, the torque transmitting balls and the assembly retainer in the form of spring pins retaining the balls in the axial recesses in the hub bore.

Referring now to FIGS. 4 and 5, a second embodiment of the assembly retainer is illustrated and designated generally by reference numeral 100. In this embodiment of the invention, the adapter 62 and the balls 70 are the same and their association with the cutter hub also remains the same. However, in this embodiment, the cutter hub is modified and designated by reference numeral 46'. The assembly retainer 100 includes a pair of angled passageways 102 formed in the hub 46' with one end of the passageway 102 communicating with the open end portion of axial recess 72'. The other end of the passageway 102 terminates flush with end surface 47' of the cutter hub 46'. As illustrated in FIG. 5, each of the recesses 72' includes a passageway 102 associated therewith.

Inserted into each passageway 102 is a spring pin 104 which extends through the passageway 102 and into and through a portion of the open end of the axial recess 72'. Thus, the end of the spring pin 104 which extends into the open end of the axial recess 72' forms an obstruction to prevent the ball 70 from exiting the axial recess 72' and functions in the same manner as the assembly retainer illustrated in FIGS. 2 and 3. The spring pin 104 is a small tubular sleeve that includes a longitudinal slit that can be driven into position and retained in its position by its resiliency. The ends of the spring pin 104 are beveled in a manner to be flush with the surfaces 47' and 49' of the hub 46' and function to prevent the balls 70 from exiting the axial recesses 72' even if the adapter 62 is moved to or assumes perpendicular relation to the cutter hub 46'.

In each embodiment of the invention, the drive shaft adapter 62 is preferably provided with four semispherical recesses 68 and 68' and the cutter hub bore is provided with four axial recesses 72 and 72' and corresponding circumferential recesses. This enables an operator of a pelletizer to disassemble the components after a predetermined period of use and wear and then reassemble the components using the recesses in the adapter and the cutter hub that were not used during the first period of use. The original balls 70 or new balls can be used depending upon the wear on the original balls. This enables the operational capabilities of the self-aligning hub to extend over a longer period of use while maintaining optimum efficiency of the hub and cutters attached thereto. Thus, for the embodiment shown in FIG. 2, the cutter hub 46 is provided with fastener receiving bores 96 in 90° spaced relation to those in use. Likewise, for the embodiment shown in FIG. 4, passageways 102 are provided in the cutter hub 46' in 90° spaced relation to those which are in use to receive a spring pin. This enables maintenance and upkeep to be enhanced without materially increasing the cost of manufacturing the cutter hub.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A self-aligning cutter hub assembly for use in an underwater pelletizer connected to a drive shaft and enabling cutter blades on a cutter hub to be aligned with and move in parallel relation to a die face on an extrusion die plate, said cutter hub assembly comprising a centrally located axial bore defined by an inner surface on said cutter hub, said inner surface of the bore being partially spherical, an adapter rigidly mountable on an end of said drive shaft and received in said bore, said adapter including a partially spherical outer surface with the partially spherical surfaces being closely related and matching each other, each of the partially spherical surfaces including a pair of recesses each receiving a torque transmitting element partially received in each of the recesses in the matching surfaces to drivingly connect the hub to the drive shaft and enable pivotal movement of the hub on said end of said drive shaft, and a removable retainer on said cutter hub which forms an obstruction for an open end of each of said recesses in the hub to retain said elements in said recesses by direct contact with said elements when said adapter is in perpendicular relation to said shaft.

2. The cutter hub assembly as defined in claim 1, wherein said torque transmitting element is a spherical ball.

3. The cutter hub assembly as defined in claim 1, wherein said retainer is a plate mounted on said hub and forming said obstruction at an outer end of said recess in the hub to retain said torque transmitting element in the recess.

4. The cutter hub assembly as defined in claim 1, wherein said retainer includes a spring pin inserted into an angled passageway with one end of the pin extending into said open end of the recess in the hub to prevent the ball from exiting the recess.

5. The cutter hub assembly as defined in claim 1, wherein said partially spherical surface in the cutter hub includes an axial semicylindrical recess extending from an end surface of said cutter hub, said partially spherical surface in the cutter hub including recesses extending circumferentially to both sides of the semicylindrical recess in the cutter hub to enable insertion of the partially spherical surface of the adapter into cutter hub bore when the adapter is oriented in 90° relation to the cutter hub bore with the semicylindrical recess receiving the torque transmitting element and the circumferential recesses receiving the partially spherical surfaces on the adapter to enable assembly of the adapter by moving it inwardly into the bore when in an 90° relation to the cutter hub and then pivoting it 90° to orient the partially spherical surfaces in registry with each other.

6. A self-aligning tatter hub drivingly connected to a drive shaft to enable the hub to pivot universally in relation to a rotational axis of the drive shaft, said hub including a bore therethrough having an inner surface provided with an arcuate curvature having a center at the center of the hub, an adapter mounted on said drive shaft and received in said bore, said adapter having an arcuately curved outer surface having a center at the center of the hub, said inner surface of the bore terminating at an end surface of the bore, said outer surface of the adapter terminating at end edges of said adapter to enable relative angular movement of the hub as the edge portions of the adapter move out of alignment with the end surfaces of the hub and torque transmitting members interconnecting the outer surface of the adapter and the inner surface of the hub bore, said torque transmitting members being spherical balls partially received in recesses in each of the curved surfaces and a retainer associated with each ball receiving recess in said hub bore to retain the balls in the recesses by direct contact with said balls when said adapter is removed from said shaft and pivoted into perpendicular relation to said hub.

7. The hub as defined in claim 6, wherein the external surface of the adapter includes a pair of semispherical recesses, the internal surface of the bore including axial recesses receiving the torque transmitting balls and enabling insertion of the exterior surface of the adapter into the interior surface of the bore when the adapter is at 90° to the bore with the adapter being rotated 90° to be received within the bore with the matching curved surfaces and the torque transmitting balls retaining the adapter in the bore after assembly, said retainer including an obstruction in an open end portion of each axial recess in the internal surface of the bore to prevent the balls from exiting the recesses in the bore by direct contact of said retainer with said balls.

8. The hub as defined in claim 7, wherein said obstruction comprises a retainer member secured in closing relation to an open end of said recesses in the interior surface of said hub bore to retain said balls in said recesses.

9. The hub as defined in claim 8, wherein said retainer member is a circular plate secured in place by a screw threaded fastener threaded into said hub.

10. The hub as defined in claim 7, wherein said obstruction comprises spring pins inserted into angled passageways in said hub, said pins extending into the open end of said recesses to retain said balls in said recesses in said hub.

11. In combination, a self-aligning cutter hub for connection with a drive shaft to enable the hub to pivot universally in relation to a rotational axis of the drive shaft, said hub including an inner surface provided with an arcuate curvature, an adapter drivingly connected to the drive shaft, said adapter having an arcuately curved outer surface engaged with said arcuately curved inner surface on the hub to enable pivotal movement of the hub in relation to the adapter, and torque transmitting structure interconnecting the outer surface of the adapter and the inner surface of the hub for driving said hub, and a retainer associated with said hub and adapter to retain said torque transmitting structure in assembled interconnected relation to the hub and adapter.

12. The hub as defined in claim 11, wherein said torque transmitting structure includes a pair of torque transmitting members diametrically opposed on the arcuately curved outer surface of the adapter, the arcuately curved inner surface of said hub including a pair of diametrically opposed axial recesses aligned with and receiving said torque transmitting members on said outer surface of the adapter, each of said recesses in the inner surface of the hub having an open end extending to one end of the hub to enable insertion of said torque transmitting member on the adapter when the outer surface of the adapter is engaged with the inner surface of the hub, each recess in the inner surface of the hub having an inner closed end spaced inwardly from the open end of the recess, said open end of the recesses in the inner surface of the hub enabling axial insertion of the adapter and torque transmitting members, said retainer including an obstruction for each of said recesses outwardly of said torque transmitting members to retain the torque transmitting members from moving through the open ends of said recesses.

13. The hub as defined in claim 12, wherein said torque transmitting members are spherical balls received in semispherical recesses on the curved outer surface of the adapter, said recesses in the inner surface of the hub being substantially semicylindrical to enable insertion of said adapter and said balls into the recesses in the inner surface of the hub, said obstruction being in the for of a plate forming a closure for said open end of each of said recesses in the hub.

14. The hub as defined in claim 12, wherein said torque transmitting members are spherical balls received in semispherical recesses on the curved outer surface of the adapter, said recesses in the inner surface of the hub being substantially semicylindrical to enable insertion of said adapter and said balls into the recesses in the inner surface of the hub, said obstruction being in the form of a pin inserted into each of said recesses between said balls and the open end of said recesses on the inner surface of the hub to prevent the torque transmitting balls from exiting the recesses in the hub.

15. In an underwater pelletizer including a die plate having a plurality of extrusion orifices terminating at a die face, a cutter assembly mounted on a drive shaft for rotating the cutter assembly in facing relation to the die plate, said cutter assembly including a plurality of cutting elements movable in close parallel relation to the die face for cutting plastic extruded from the orifices into pellets, said cutter assembly including a hub mounted on the drive shaft in a manner to enable substantial universal pivotal movement in relation to the drive shaft for self-alignment of the cutting elements with the die face, said hub including a bore therethrough at the center thereof, said bore having an inner face with a partial spherical surface, and an adapter mounted on said drive shaft, said adapter having a partial spherical curved outer surface, said adapter being received in said bore with the partial spherical surfaces being in opposed relation to enable substantial universal pivotal movement of the hub in relation to the drive shaft, each partial spherical surface including opposed recesses receiving torque transmitting spherical balls to drive the hub while permitting said substantial universal pivotal movement, each of said recesses in the curved outer surface of the adapter being substantially semispherical for receiving a portion of one said torque transmitting ball, said recesses in the inner surface of the bore being substantially semicylindrical to enable insertion of said adapter and said balls into the recesses in the inner surface of the bore, each of said recesses in the inner surface of the bore having a partial spherical inner end for engaging a portion of one said torque transmitting ball and an open end opposed to said inner end, each of said semicylindrical recesses including lateral recesses extending a short distance circumferentially in the inner surface of the bore from opposite edges of the semicylindrical recesses to enable the outer curved surface of the adapter to be inserted into and removed from the inner curved surface of the bore when the adapter is in perpendicular relation to said hub, said torque transmitting balls being capable of exiting from said open ends of said semicylindrical recesses and said torque transmitting balls being subject to dropping out of said semispherical recesses in the adapter when said adapter is perpendicular to said hub, said adapter being rotatable into alignment with the hub such that the partial spherical surfaces on the adapter and in the hub bore retain and support the hub on the adapter and a removable ball retainer adjacent each said semicylindrical recess to block exiting movement of said balls from the semicylindrical recesses when the adapter is in said perpendicular relation to the hub thereby retaining the hub and adapter in assembled relation.

16. The structure as defined in claim 15, wherein said semispherical recesses and lateral recesses in the bore of said hub and the semispherical recesses in said adapter enable pivotal movement of the adapter between aligned relation to the hub to perpendicular relation to the hub when assembling and disassembling said hub and adapter.

17. The structure as defined in claim 15, wherein said ball retainer includes a pin inserted into each semicylindrical recess between the ball and the open end of each semicylindrical recess to block exiting movement of the balls when the adapter is perpendicular to said hub.

18. The structure as defined in claim 15, wherein said ball retainer includes a plate positioned in overlying relation to the open end of said semicylindrical recesses and removably secured to said hub to block exiting movement of the balls when the adapter is perpendicular to said hub.

* * * * *